United States Patent
Oh et al.

(10) Patent No.: US 9,804,772 B2
(45) Date of Patent: Oct. 31, 2017

(54) METHOD AND APPARATUS FOR GENERATING A NEW MENU ITEM BY DIVIDING OR MERGING A MENU ITEM DISPLAYED ON A PORTABLE TERMINAL

(75) Inventors: Sang-Hoon Oh, Suwon-si (KR); Nam-Il Lee, Suwon-si (KR); In-Yong Choi, Uiwang-si (KR); Seok-Yeong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 759 days.

(21) Appl. No.: 13/176,201

(22) Filed: Jul. 5, 2011

(65) Prior Publication Data

US 2012/0011470 A1    Jan. 12, 2012

(30) Foreign Application Priority Data

Jul. 12, 2010   (KR) .................. 10-2010-0066735

(51) Int. Cl.
| | | |
|---|---|---|
| G06F 3/048 | (2013.01) | |
| G06F 3/0488 | (2013.01) | |
| G06F 3/0482 | (2013.01) | |

(52) U.S. Cl.
CPC ........ G06F 3/04883 (2013.01); G06F 3/0482 (2013.01)

(58) Field of Classification Search
CPC .............. G06F 3/0484; G06F 3/04842; G06F 3/04883; G06F 3/0482
USPC ....................................... 715/811
See application file for complete search history.

(56) References Cited

U.S. PATENT DOCUMENTS

| | | | | |
|---|---|---|---|---|
| 4,914,568 A | * | 4/1990 | Kodosky et al. | 715/763 |
| 5,421,008 A | * | 5/1995 | Banning et al. | 707/999.004 |
| 5,428,737 A | * | 6/1995 | Li et al. | 707/999.004 |
| 5,491,783 A | * | 2/1996 | Douglas et al. | 715/846 |
| 5,553,224 A | * | 9/1996 | Saund et al. | 345/619 |
| 5,619,640 A | * | 4/1997 | Tezuka et al. | 715/762 |
| 5,644,740 A | * | 7/1997 | Kiuchi | 715/853 |
| 5,748,929 A | * | 5/1998 | Conrad et al. | 715/810 |
| 5,760,776 A | * | 6/1998 | McGurrin et al. | 715/841 |
| 5,787,432 A | * | 7/1998 | LeTourneau | 707/741 |
| 5,861,886 A | * | 1/1999 | Moran et al. | 715/863 |
| 5,889,523 A | * | 3/1999 | Wilcox et al. | 715/854 |

(Continued)

FOREIGN PATENT DOCUMENTS

| | | | | |
|---|---|---|---|---|
| EP | 1033649 A2 | * | 9/2000 | G06F 9/44 |
| KR | 10-2008-0102644 A | | 11/2008 | |

(Continued)

OTHER PUBLICATIONS

Adams, "Implementing Sets Efficiently in a Functional Language", University of Southampton, CSTR 92-10, 1992.*

(Continued)

*Primary Examiner* — Jennifer To
*Assistant Examiner* — Joseph R Burwell
(74) *Attorney, Agent, or Firm* — Jefferson IP Law, LLP

(57) ABSTRACT

A method and an apparatus for managing a menu item in a portable terminal are provided. In the method, at least one item is selected from items displayed on a screen according to a user control. An attribute of selected at least one item is determined. A new item is generated by one of dividing and merging the at least one item depending on the determined attribute.

6 Claims, 17 Drawing Sheets

(56) References Cited

U.S. PATENT DOCUMENTS

| | | | |
|---|---|---|---|
| 6,003,034 A * | 12/1999 | Tuli | 707/999.101 |
| 6,105,062 A * | 8/2000 | Andrews et al. | 709/223 |
| 6,154,875 A * | 11/2000 | Tanaka et al. | 717/107 |
| 6,163,317 A * | 12/2000 | de Judicibus | 715/853 |
| 6,275,976 B1 * | 8/2001 | Scandura | G06F 11/3696 714/E11.208 |
| 6,278,452 B1 * | 8/2001 | Huberman et al. | 715/764 |
| 6,348,935 B1 * | 2/2002 | Malacinski et al. | 715/853 |
| 7,386,835 B1 * | 6/2008 | Desai | G06F 8/38 715/760 |
| 7,461,077 B1 * | 12/2008 | Greenwood | 707/999.003 |
| 7,665,022 B1 * | 2/2010 | Bednarz, Jr. | 715/721 |
| 7,668,845 B1 * | 2/2010 | Lomet et al. | 707/711 |
| 7,720,887 B2 * | 5/2010 | McCormack et al. | 707/805 |
| 2002/0149602 A1 * | 10/2002 | Redpath et al. | 345/629 |
| 2002/0152222 A1 * | 10/2002 | Holbrook | G06F 17/30696 707/999.104 |
| 2007/0162496 A1 * | 7/2007 | Pulfer | G06Q 10/06 707/999.104 |
| 2007/0300162 A1 * | 12/2007 | Goto | 715/745 |
| 2008/0027908 A1 * | 1/2008 | Durbeck | G06F 17/30516 707/999.002 |
| 2008/0109751 A1 * | 5/2008 | Fitzmaurice et al. | 715/793 |
| 2008/0229222 A1 * | 9/2008 | Kake | G06F 3/0481 715/764 |
| 2008/0288886 A1 * | 11/2008 | Sherwood et al. | 715/772 |
| 2008/0307361 A1 * | 12/2008 | Louch et al. | 715/835 |
| 2009/0019385 A1 * | 1/2009 | Khatib et al. | 715/765 |
| 2009/0126020 A1 * | 5/2009 | Norton et al. | 709/201 |
| 2010/0058182 A1 * | 3/2010 | Jung | 715/702 |
| 2010/0064208 A1 | 3/2010 | Valtchev | |
| 2010/0138763 A1 * | 6/2010 | Kim | 715/765 |
| 2010/0312747 A1 * | 12/2010 | Stolte et al. | 707/602 |
| 2011/0055755 A1 * | 3/2011 | Chen | G06F 3/0482 715/810 |
| 2011/0161371 A1 * | 6/2011 | Thomson et al. | 707/792 |
| 2012/0311496 A1 * | 12/2012 | Cao et al. | 715/821 |

FOREIGN PATENT DOCUMENTS

| | | |
|---|---|---|
| KR | 10-2009-0006781 A | 1/2009 |
| KR | 10-2010-0024642 A | 3/2010 |
| KR | 10-2010-0026720 A | 3/2010 |

OTHER PUBLICATIONS

Arimura et al., "An Output-Polynomial Time Algorithm for Mining Frequent Closed Attribute Trees", Proceedings of the 15th International Conference on Inductive Logic Programming (ILP 2005), pp. 1-19, Aug. 2005.*

Balcazar et al., "Mining frequent closed rooted trees", Machine Learning, vol. 78, Issue 1 (Jan. 2010), pp. 1-33, published online Jul. 23, 2009.*

* cited by examiner

METHOD AND APPARATUS FOR GENERATING A NEW MENU ITEM BY DIVIDING OR MERGING A MENU ITEM DISPLAYED ON A PORTABLE TERMINAL

PRIORITY

This application claims the benefit under 35 U.S.C. §119 (a) of a Korean patent application filed in the Korean Intellectual Property Office on Jul. 12, 2010 and assigned Serial No. 10-2010-0066735, the entire disclosure of which is hereby incorporated by reference.

BACKGROUND OF THE INVENTION

1. Field of the Invention

The present invention relates to a method and an apparatus for managing a menu item in a portable terminal. More particularly, the present invention relates to a method and an apparatus for providing a user interface that changes a menu item based on meaning.

2. Description of the Related Art

Generally, a portable terminal has a limitation in an amount of information that can be displayed on a screen due to its small size. Therefore, the portable terminal of the related art uses a technique of classifying each data or application to one of a plurality of items according to an attribute and displaying the plurality of items on a screen in order to effectively represent information on a screen having a limited size. That is, most portable terminals provide a user interface including application items or data items estimated to be desirable by the majority of users.

However, the above-mentioned technique for providing a user interface may not reflect the desires of each individual user, so that some users may feel inconvenienced by having to access a desired item through the user interface. Of course, the portable terminal of the related art provides a function of changing a user interface according to an individual user's taste. However, since this function is not performed by the portable terminal of the related art but is performed via a server, it is difficult to change the user interface in real-time and this function is somewhat difficult and complicated for all users to use.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for managing a menu item in a portable terminal.

Another aspect of the present invention is to provide a method and an apparatus for providing a user interface for managing a menu item based on meaning in a portable terminal.

Still another aspect of the present invention is to provide a method and an apparatus for generating one item by merging a plurality of items based on meaning in a portable terminal.

Yet another aspect of the present invention is to provide a method and an apparatus for generating a plurality of items by dividing one item based on meaning in a portable terminal.

Still yet another aspect of the present invention is to provide a method and an apparatus for changing a menu item according to a user's control in a portable terminal.

In accordance with an aspect of the present invention, a method for managing a menu item in a portable terminal is provided. The method includes selecting at least one item from items displayed on a screen according to a user's manipulation, determining an attribute of the selected at least one item, and generating a new item by one of dividing and merging the at least one item depending on the determined attribute.

In accordance with another aspect of the present invention, an apparatus for managing a menu item in a portable terminal is provided. The apparatus includes a user input unit for selecting at least one item from items displayed on a screen according to a user's manipulation, and a menu item controller for determining an attribute of the selected at least one item, and for generating a new item by one of dividing and merging the at least one item depending on the determined attribute.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for providing a user interface that manages a menu item based on meaning under a user's control in a portable terminal.

Exemplary embodiments of the present invention generate a plurality of items by dividing one item or generate a new item by merging a plurality of items depending on a user's touch motion with respect to an item forming a menu.

Figure 1:
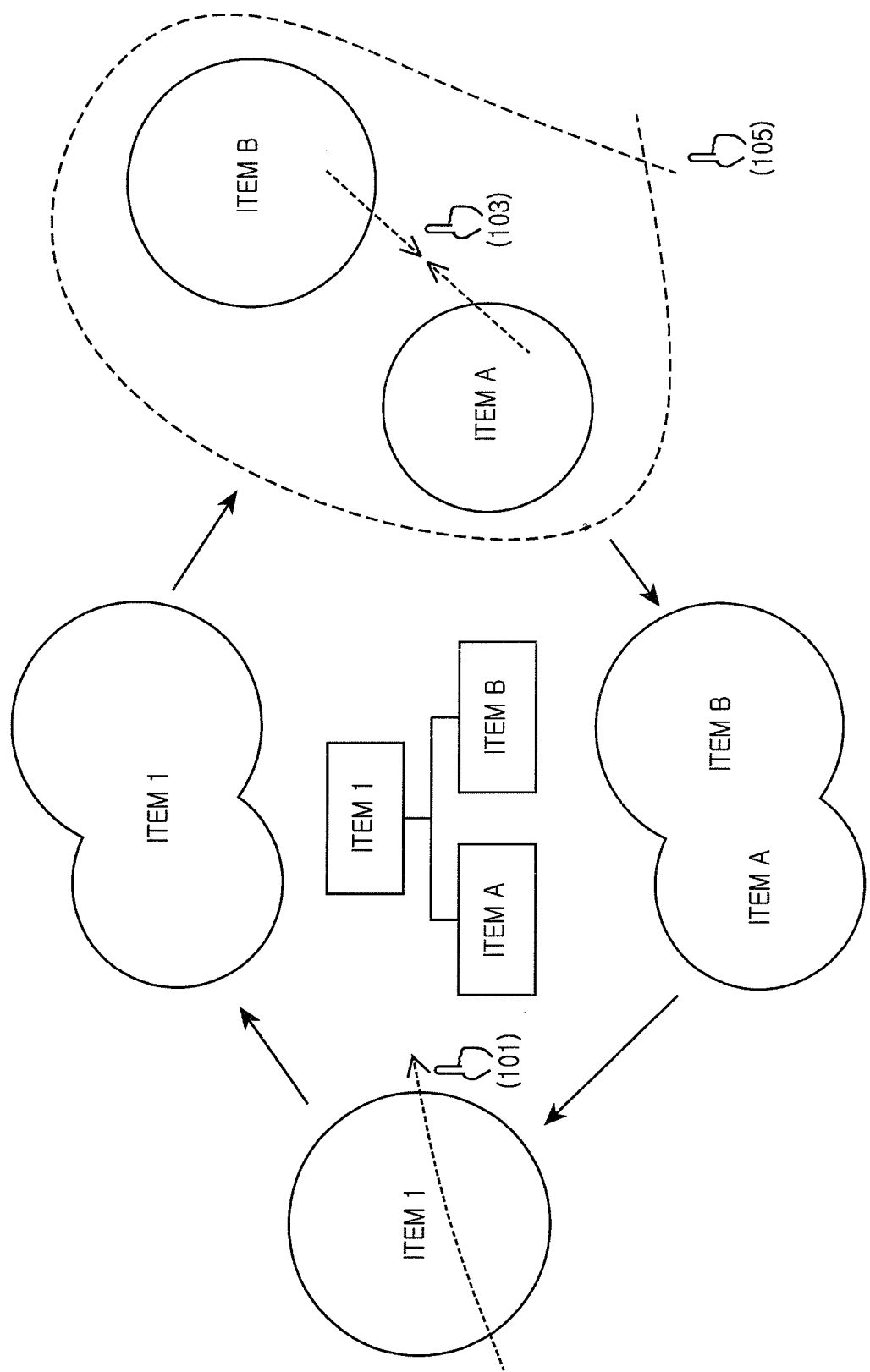
FIG. 1 is a view illustrating an example of changing a menu item under a user's control in a portable terminal according to an exemplary embodiment of the present invention.

FIG. 1 is a view illustrating an example of changing a menu item under a user's control in a portable terminal according to an exemplary embodiment of the present invention.

Referring to FIG. 1, when a user performs a touch 101 across an item 1, the portable terminal may generate an item A and an item B by dividing the item 1. In contrast, when the user performs a touch 103 simultaneously from each of the item A and the item B toward the other or performs a touch 105 of a closed curve shape including the item A and the item B, the portable terminal may generate the item 1 by merging the item A and the item B. At this point, the user's touch motion for dividing or merging the item(s) may be changed by a designer or the user. For example, when the user doubly touches (or double-clicks) a relevant item, the user may set such that the relevant item is divided. In addition, though a portable terminal having a touch screen divides or merges an item depending on the user's touch motion for convenience in description, a relevant item may be divided or merged through the user's manipulation using a keypad.

Figure 2:
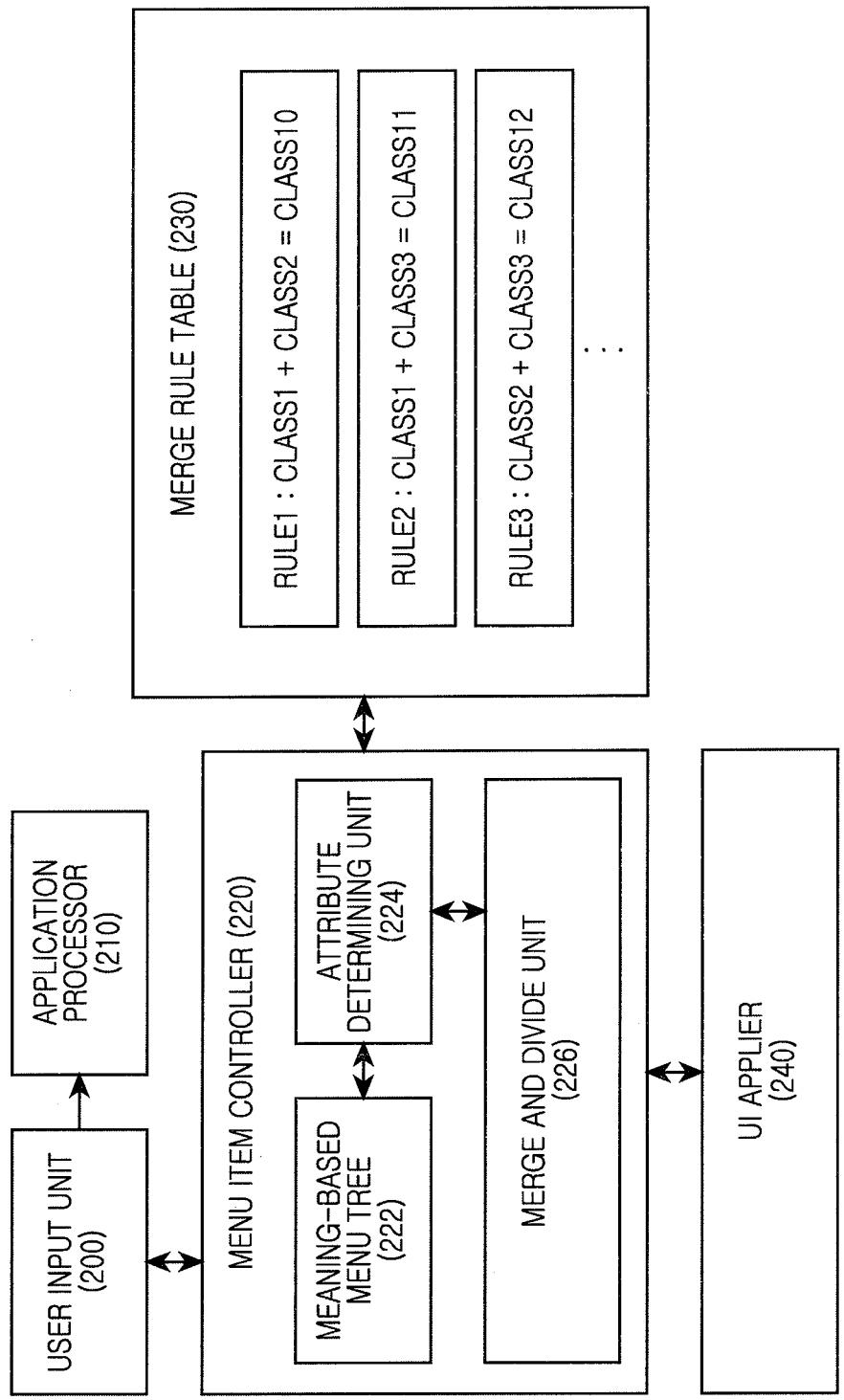
FIG. 2 is a block diagram illustrating a portable terminal according to an exemplary embodiment of the present invention.

FIG. 2 is a block diagram illustrating a portable terminal according to an exemplary embodiment of the present invention.

Referring to FIG. 2, the portable terminal includes a user input unit 200, an application processor 210, a menu item controller 220, a merge rule table 230, and a User Interface (UI) applier 240.

The user input unit 200 includes a touch sensor for detecting a user's touch for a screen and at least one key. The user input unit 200 detects a position touched by a user, determines a relevant touch operation through a corresponding coordinate, and then determines whether a relevant touch operation is a touch operation set for changing a menu item. For example, the user input unit 200 determines whether a touch operation by a user is a slide operation that touches an item displayed on the screen across the item, a drag operation that touches a plurality of items by pulling the plurality of items displayed on the screen toward each other, or a touch operation of a closed curve shape including a plurality of items displayed on the screen. In addition, the user input unit 200 may determine whether an event for changing a menu item occurs through data corresponding to a key input by the user. When a user input is for changing a menu item, the user input unit 200 provides information regarding at least one item selected by the user input and a menu item change function corresponding to the user input to the menu item controller 220. In contrast, when the user input is not for changing the menu item, the user input unit 200 requests the application processor 210 to perform a function corresponding to the user input.

The application processor 210 performs a function corresponding to the request from the user input unit 200. For example, when the user's click on an item displayed on the screen is input from the user input unit 200, the application processor 210 performs a function corresponding to the clicked item.

The menu item controller 220 performs a menu item change function corresponding to the request from the user input unit 200. That is, the menu item controller 220 includes a meaning-based menu tree 222, an attribute determining unit 224, and a merge and divide unit 226, determines an attribute for at least one item selected by the user input unit 200, generates a plurality of items by dividing selected at least one item, or generates one item by merging a plurality of selected items.

The meaning-based menu tree 222 denotes a menu tree representing relations and attributes regarding all items provided via the user interface. Here, the attribute may denote a meaning (or a characteristic) regarding contents or applications included in a relevant item. The meaning-based menu tree 222 represents a step and an attribute representing a depth inside the menu tree with respect to items selected by the user input unit 200. Here, the meaning-based menu tree 222 represents attributes for respective items for each step. An example of the meaning-based menu tree 22 is shown in FIG. 4.

Figure 4:
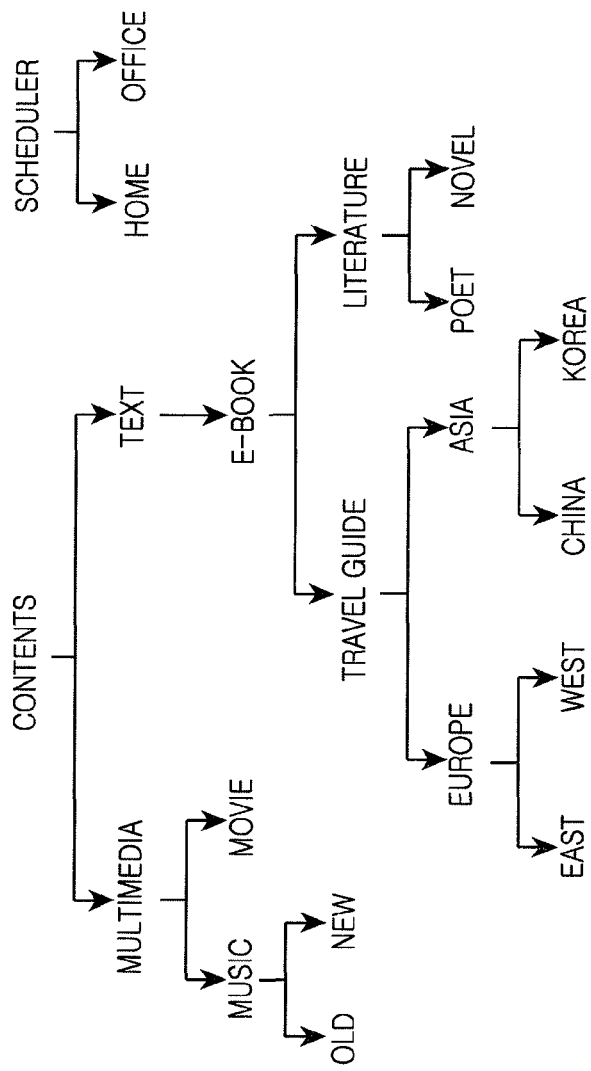
FIG. 4 is a view illustrating a menu structure and an attribute of a menu item in a portable terminal according to an exemplary embodiment of the present invention.

FIG. 4 is a view illustrating a menu structure and an attribute of a menu item in a portable terminal according to an exemplary embodiment of the present invention.

Referring to FIG. 4, the meaning-based menu tree 222 may represent relations and attributes regarding the respective items.

Returning to FIG. 2, the attribute determining unit 224 searches for the attributes of items selected by the user input unit 200 from the meaning-based menu tree 222, and then provides the same to the merge and divide unit 226.

The merge and divide unit 226 generates a plurality of items by dividing one item selected by the user input unit 200 according to the attribute of an item provided from the attribute determining unit 224, or generates a new item by merging a plurality of items selected by the user input unit 200. When a signal representing an occurrence of a touch operation for dividing a specific item is input from the user input unit 200, the merge and divide unit 226 receives at least one lower step attribute for the specific item from the attribute determining unit 224, and divides various contents included in the specific item according to the attribute to generate new items including divided contents. For example, as illustrated in FIG. 1, in the case where lower contents included in an item 1 have an attribute a and an attribute b, the merge and divide unit 226 may divide the contents into contents having the attribute a and contents having the attribute b, and then generate an item A including contents having the attribute a and an item B including contents having the attribute b. Here, when an item to be divided has a plurality of attributes, the merge and divide unit 226 may generate a plurality of items corresponding to the number of attributes, and may receive a dividing scheme from the user to generate a smaller number of items than the number of attributes. For example, in the case where contents included in the item 1 have the attribute a, the attribute b, and an attribute c, the merge and divide unit 226 may divide the item 1 into an item A including contents of the attribute a, an item B including contents of the attribute b, and an item c including contents of the attribute c. Depending on the user's selection, the merge and divide unit 226 may divide the item 1 into an item d including contents of the attribute a and contents of the attribute b, and an item c including contents of the attribute c, or may divide the item 1 into the item A including the contents of the attribute a and an item e including contents of the attribute b and contents of an attribute c. At this point, the merge and divide unit 226 displays attributes for an item to be divided on the screen to control and process a function for requesting the user to set a division scheme.

In addition, when a signal representing an occurrence of a touch operation for merging a plurality of items is input from the user input unit 200, the merge and divide unit 226 receives at least one attribute for the plurality of items from the attribute determining unit 224, compares whether the attributes of the plurality of items are the same, and generates a new item depending on a comparison result. First, the merge and divide unit 226 determines whether parent items are the same by comparing the attributes of the plurality of items. When the parent items of the plurality of items are the same, the merge and divide unit 226 generates one item by merging the plurality of items. At this point, the step of the generated item is set to a one-step higher step than the plurality of items. When the parent items of the plurality of items are not the same, the merge and divide unit 226 determines whether a merge rule corresponding to the plurality of items exists with reference to the merge rule table 230. When the corresponding merge rule exists, the merge and divide unit 226 generates a new item by merging the plurality of items according to the relevant merge rule. In contrast, when the merge rule corresponding to the plurality of items does not exist in the merge rule table 230, the merge and divide unit 226 determines whether the attributes of the plurality of items are greater than a threshold step and are the same. When the attributes of the plurality of items are greater than a threshold step and are the same, the merge and divide unit 226 generates a new item by merging the plurality of items. At this point, the step of the generated item is set to a one-step lower step than a lowest step among the same attributes of the plurality of items. Here, when the attributes of the plurality of items are not greater than the threshold step and are not the same, the merge and divide unit 226 performs a function of informing the user that it cannot merge the plurality of items. For example, the merge and divide unit 226 performs a function of generating a message, vibration, or an alarm note informing that the merging of the plurality of items are not impossible through the user interface.

The merge and divide unit 226 may set titles of items generated by the division and merge with consideration of the attributes or meanings of the items, or may set the title of a relevant item by receiving the title from the user.

The merge rule table 230 represents a rule for generating an item having a new meaning based on specific items stored in the portable terminal. For example, the merge rule table 230 may define generation of an item of class 10 by merging an item of class 1 and an item of class 2, and may define generation of an item of class 11 by merging an item of class 1 and an item of class 3. At this point, the merge rule table 230 may represent a new meaning for the generated item. For example, when merging an item including movie contents and an item including novel contents, the merge rule table 230 may define generation of a new item including novel and movie contents. At this point, the generated item may represent contents for a movie based on a novel. Here, the merge rule table 230 may be updated by a designer or a user.

The UI applier 240 controls and processes a function for applying information regarding items divided or merged by the menu item controller 220 and the menu tree changed by the divided or merged items to the user interface. For example, the UI applier 240 may display divided items on the screen or display merged items on the screen.

Figure 3A:
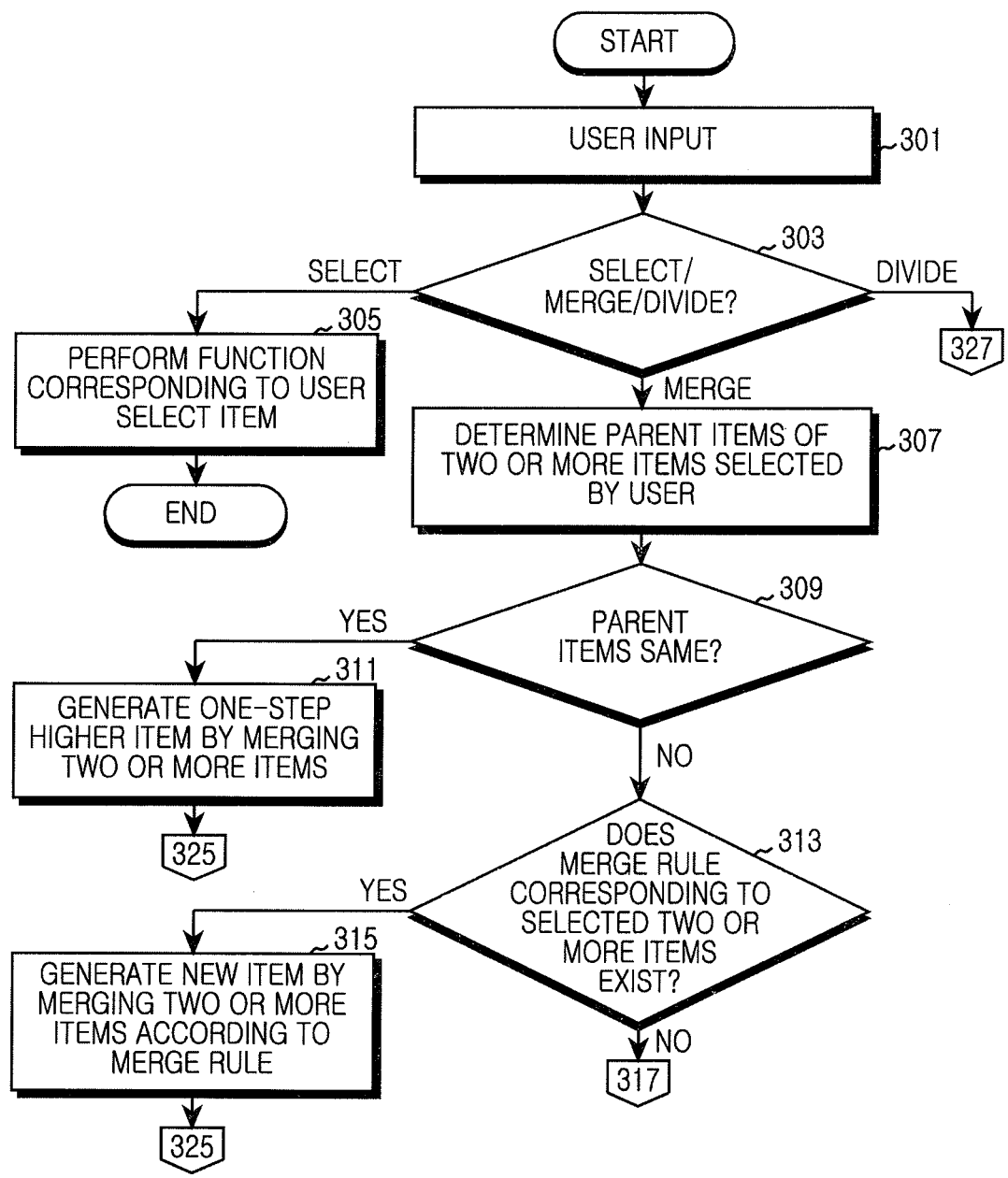
FIGS. 3A through 3C are views illustrating a procedure of changing a menu item in a portable terminal according to an exemplary embodiment of the present invention.
Figure 3B:
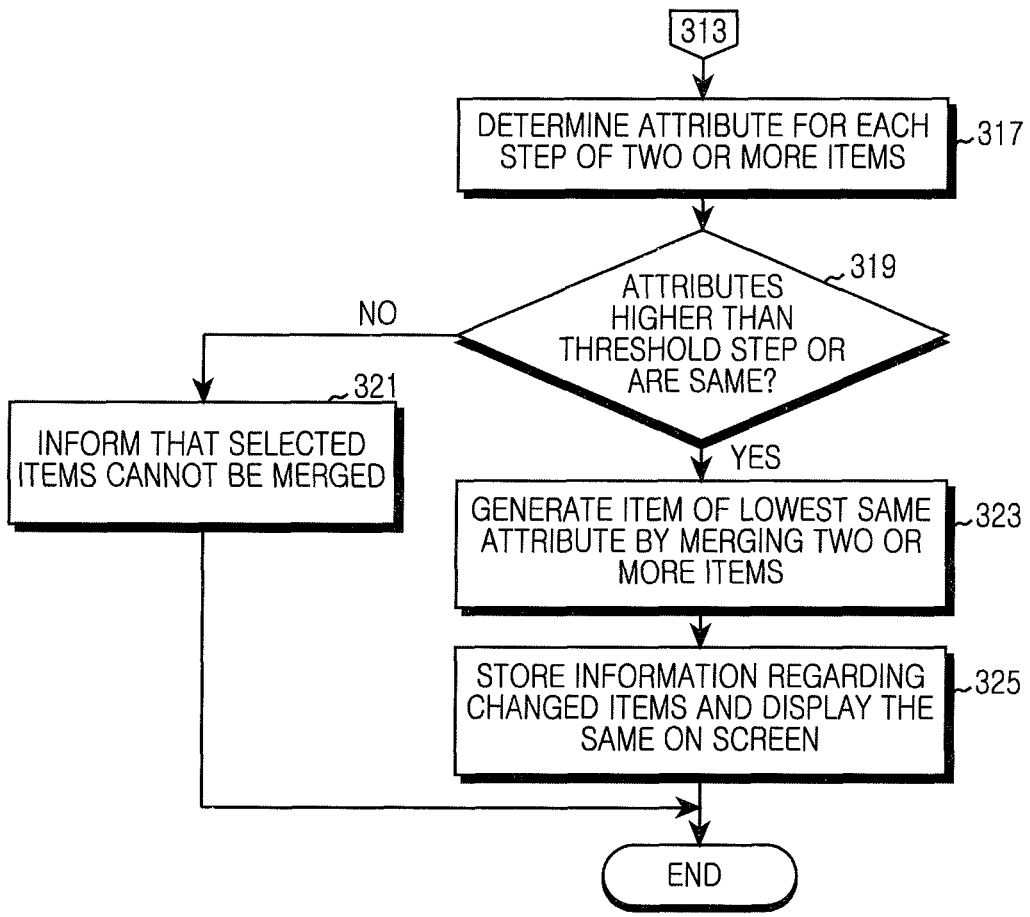
Figure 3C:
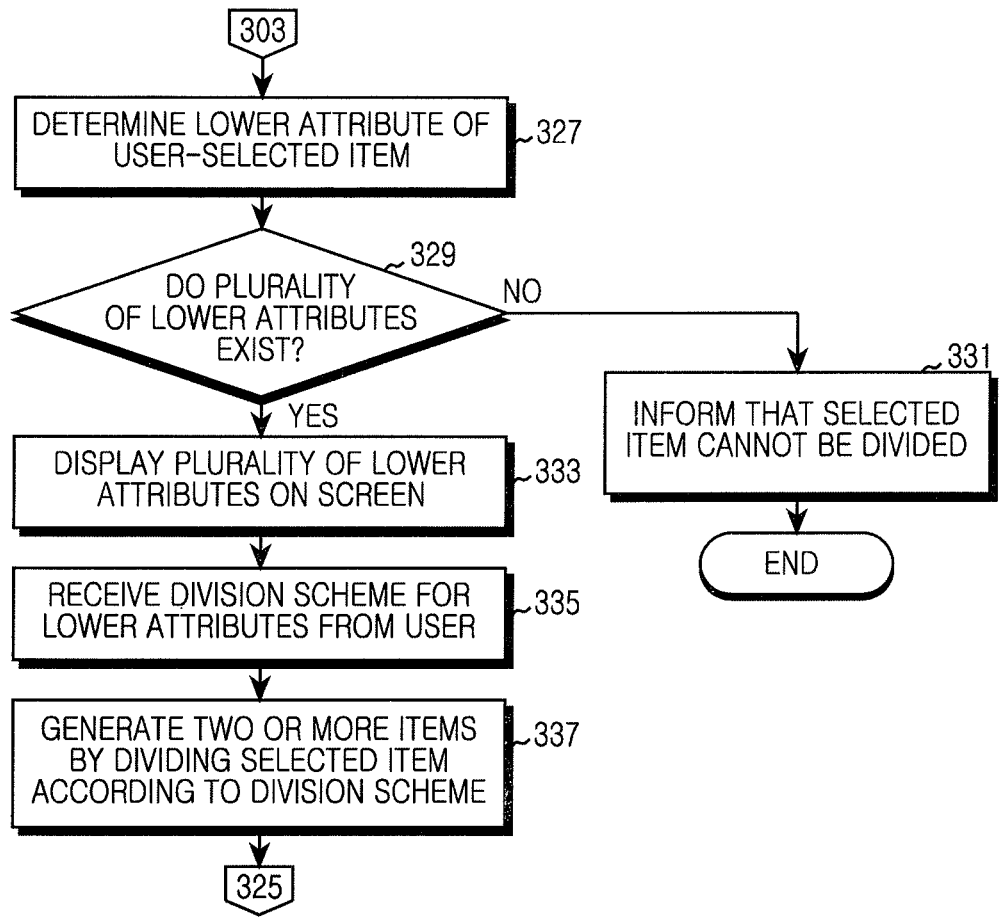

FIGS. 3A through 3C are views illustrating a procedure of changing a menu item in a portable terminal according to an exemplary embodiment of the present invention.

Referring to FIG. 3A, the portable terminal receives an input from a user in step 301, and determines whether the user input is an input for selecting an item forming a menu, or an input for merging a plurality of items, or an input for dividing one item in step 303. Here, when the user input is a touch operation of clicking a specific item displayed on the screen, the portable terminal may determine that the user input is a selection input for performing a function corresponding to a relevant item. When the user input is a drag operation of touching a plurality of items by pulling the plurality of items toward each other or is a touch operation of a closed curve shape including the plurality of items, the portable terminal may determine that the user input is an input for merging the plurality of items. In addition, when the user input is a slide operation of touching an item displayed on the screen across the item or is a touch operation of double-clicking the item, the portable terminal may determine that the user input is an input for dividing one item. Here, the user input for dividing or merging the item may be set or changed by a designer or a user. Here, when a touch for a specific item occurs according to the user input, the portable terminal may give a specific effect to an icon representing the item on which the touch occurs. For example, the portable terminal may give effects of changing the size or color of a relevant icon, or bursting like a balloon.

When the user input is an input for performing a function corresponding to a relevant item, the portable terminal proceeds to step 305 to perform a function corresponding to the selected item and end the algorithm according to an exemplary embodiment of the present invention. For example, in the case where the selected item is a specific application, the portable terminal performs the relevant application. When the selected item is a higher item including specific contents, the portable terminal performs a function of displaying the relevant contents.

In contrast, when the user input is an input for merging a plurality of items, the portable terminal proceeds to step 307 to determine the parent items of a plurality of items selected by the user input, and determines whether the parent items of the plurality of items are the same in step 309. At this point, the portable terminal may determine the parent items through the attribute of a higher step of each item.

When the parent items of the plurality of items are the same, the portable terminal proceeds to step 311 to generate an item of a one-step higher item by merging the plurality of items. That is, the portable terminal generates a new item having a one-step higher step than steps of the plurality of items and including all contents included in each of the plurality of items, and proceeds to step 325 of FIG. 3B to store information regarding changed items and display the same. An example is provided below with reference to FIG. 5.

Figure 5:
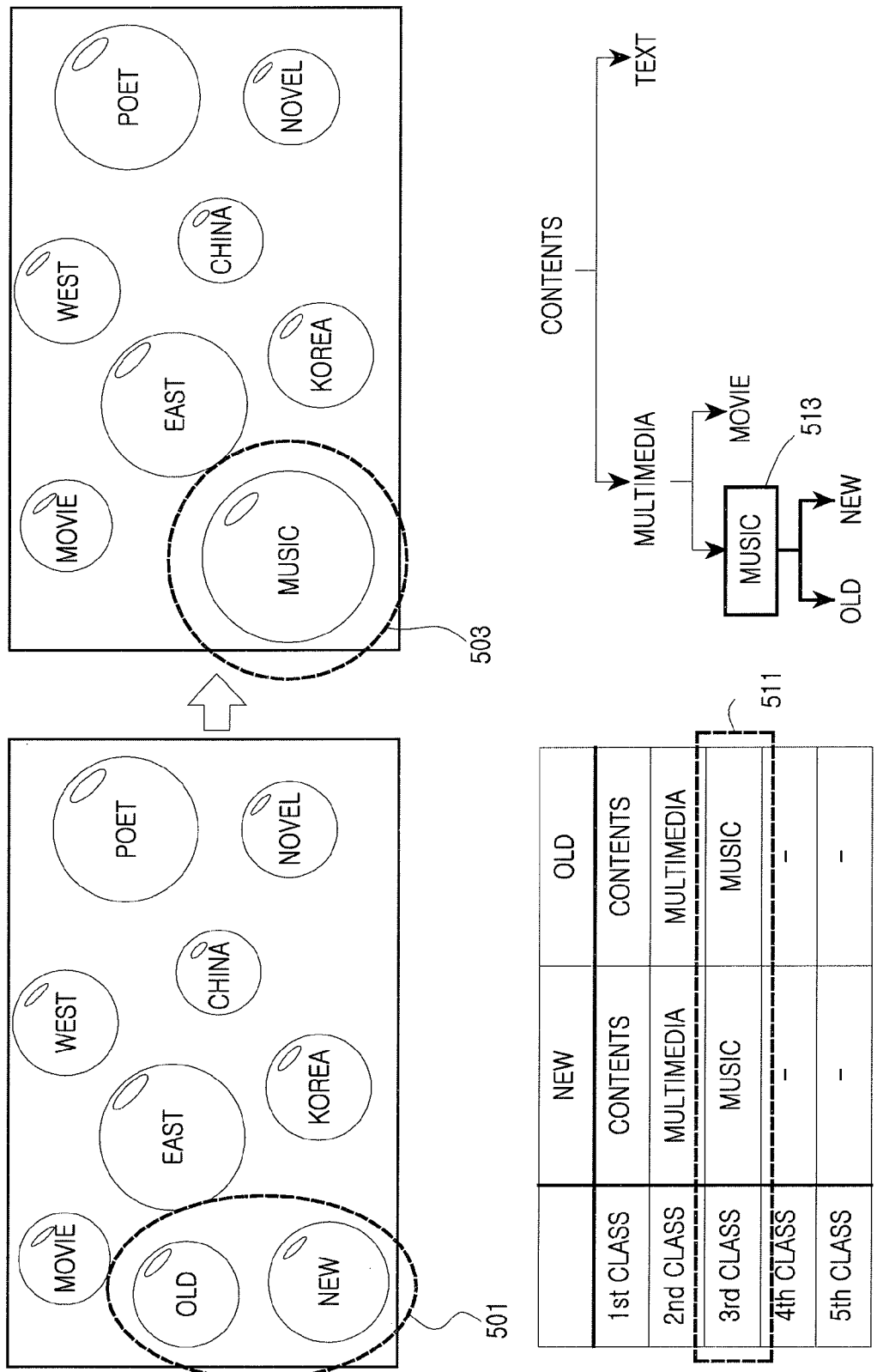
FIG. 5 is a view illustrating a case of merging a menu item according to a parent item in a portable terminal according to an exemplary embodiment of the present invention.

FIG. 5 is a view illustrating a case of merging a menu item according to a parent item in a portable terminal according to an exemplary embodiment of the present invention.

Referring to FIG. 5, in the case where the user intends to merge an item "Old" and an item "New" (collectively denoted as 501), when higher step attributes representing the parent items of the item "Old" and the item "New" are the same (as shown by 511) as "Music", and sum of the item "Old" and the item "New" is the same as the item "Music" (denoted by 513), which is the higher item, the two items to be merged may be incorporated as "Music" (denoted by 503), and the item "Music" (denoted by 503) may be displayed on the screen instead of the item "Old" and the item "New" (collectively denoted as 501).

Returning to step 309 of FIG. 3A, when the parent items of the plurality of items are not the same, the portable terminal proceeds to step 313 to determine whether a merge rule corresponding to a plurality of items selected according to the user input exists among merge rules stored in advance. When the merge rule corresponding to the plurality of items exists, the portable terminal proceeds to step 315 to generate a new item by merging the plurality of items according to the relevant merge rule, and then proceeds to step 325 of FIG. 3B to store information regarding the changed items and display the same on the screen.

An example is provided below with reference to FIG. 6.

Figure 6:
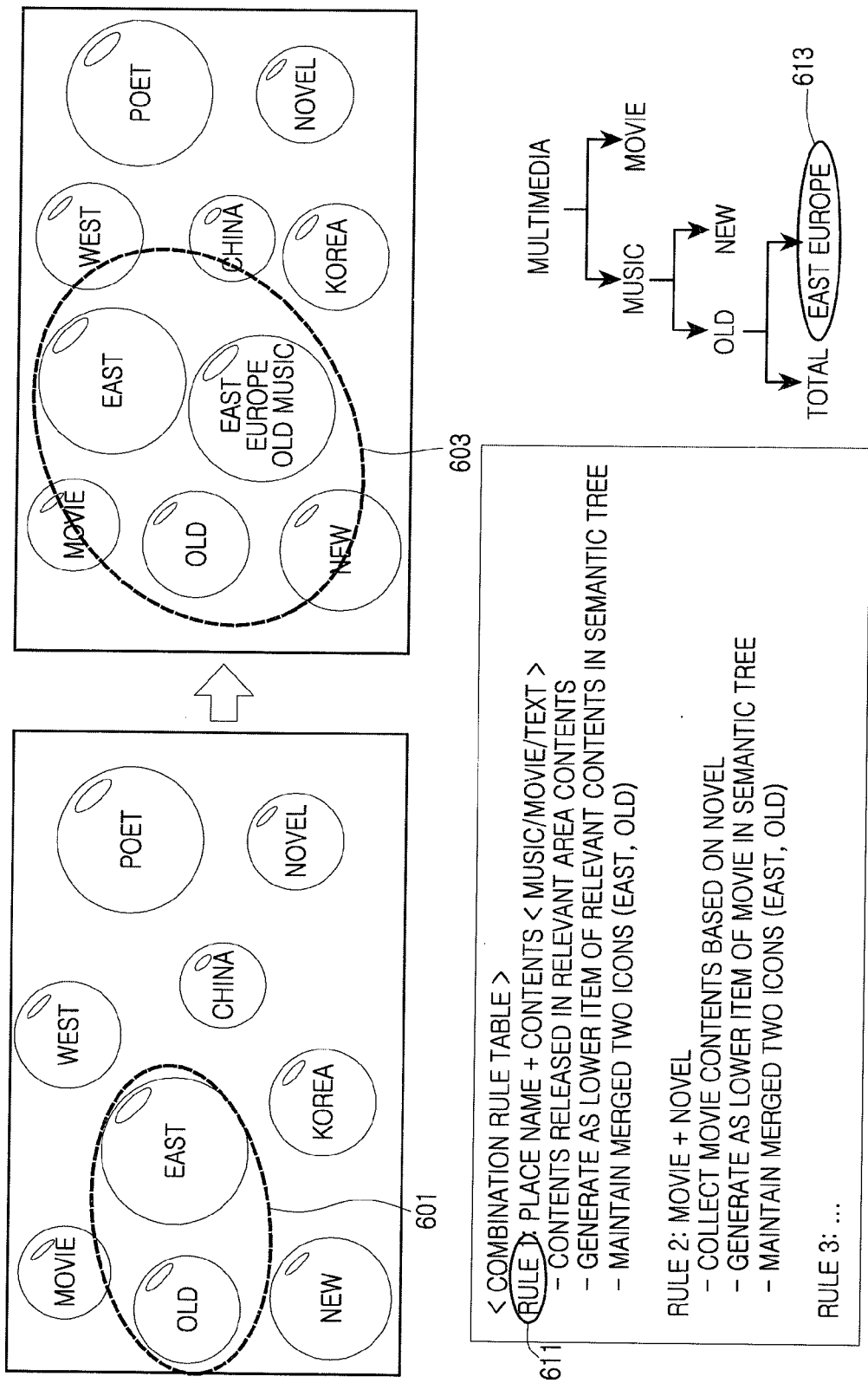
FIG. 6 is a view illustrating a case of merging a menu item according to a merge rule in a portable terminal according to an exemplary embodiment of the present invention.

FIG. 6 is a view illustrating a case of merging a menu item according to a merge rule in a portable terminal according to an exemplary embodiment of the present invention.

Referring to FIGS. 4 and 6, under a circumstance having the menu tree structure illustrated in FIG. 4, in a case of merging an item "Old" and an item "East" whose parent items are different from each other as illustrated in FIG. 6, since this case corresponds to a case of merging an area and contents (music, a movie, and a text) as in a rule 1 611 of the merge rule table, the portable terminal performs a merge operation according to the rule 1 611. That is, the portable terminal may generate an item 613 including music contents released in the area "East" according to the rule 1 611 as a lower item of the item "Old" (collectively denoted by 601).

At this point, the portable terminal may maintain the item "Old" and the item "East", and in addition, the name of the generated item may be set to "East Europe Old Music" to represent meaning of relevant contents (collectively denoted by 603), or the portable terminal may directly receive the name from the user.

Returning to step 313 of FIG. 3A, when the merge rule corresponding to the plurality of items does not exist, the portable terminal determines higher step attributes of the plurality of items in step 317 of FIG. 3B, and determines whether the higher step attributes of the plurality of items are higher than a threshold step or are the same in step 319. When the higher step attributes of the plurality of items are higher than the threshold step or are the same, the portable terminal proceeds to step 323 to merge the plurality of items and generate a one-step lower item than a step of a lowest same attribute among the same attributes, and stores information regarding the changed items and displays the same on the screen in step 325.

An example is provided below with reference to FIG. 7.

Figure 7:
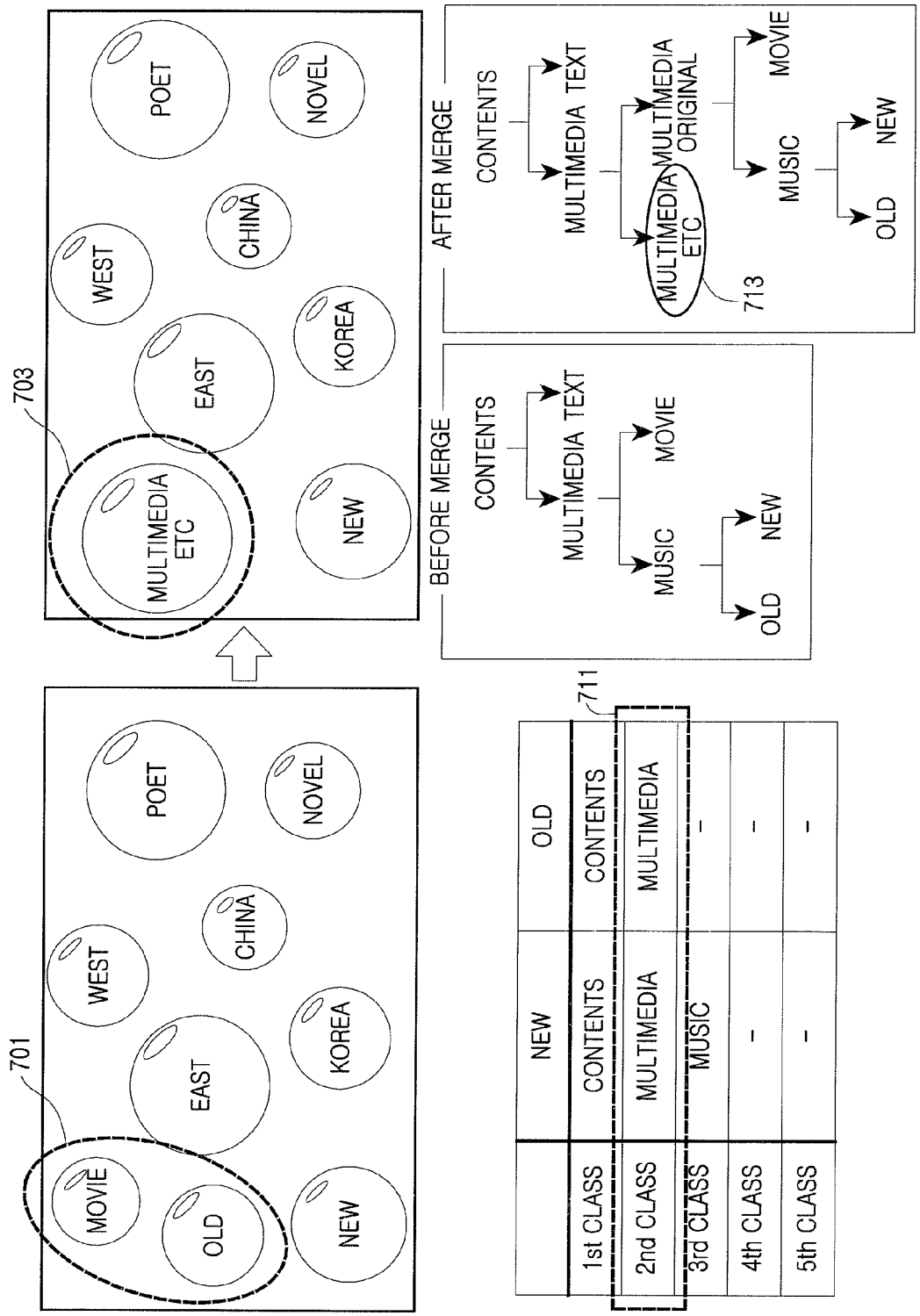
FIG. 7 is a view illustrating a case of merging a menu item according to an attribute of an item in a portable terminal according to an exemplary embodiment of the present invention.

FIG. 7 is a view illustrating a case of merging a menu item according to an attribute of an item in a portable terminal according to an exemplary embodiment of the present invention.

Referring to FIG. 7, in the case where a user intends to merge an item "Old" and an item "Movie" (collectively denoted by 701), assuming that the threshold step is a step 1, since the higher step attributes of the item "Old" and the item "Movie" are the same (as shown by 711) as "Multimedia" for a step 2, the portable terminal merges the item "Old" and the item "Movie" to generate a new item (denoted as 703 and 713) as an item of a step 3, which is one-step lower than the step 2. At this point, the attributes and the steps of the item "Old" and the item "Movie" may be maintained, or may be changed with consideration of the new item as illustrated in FIG. 7.

Returning to step 319 of FIG. 3B, in contrast, when the higher step attributes of the plurality of items are not higher than the threshold step or are not the same, the portable terminal proceeds to step 321 to inform that the plurality of items cannot be merged and ends the algorithm according to an exemplary embodiment of the present invention.

An example is provided below with reference to FIG. 8.

Figure 8:
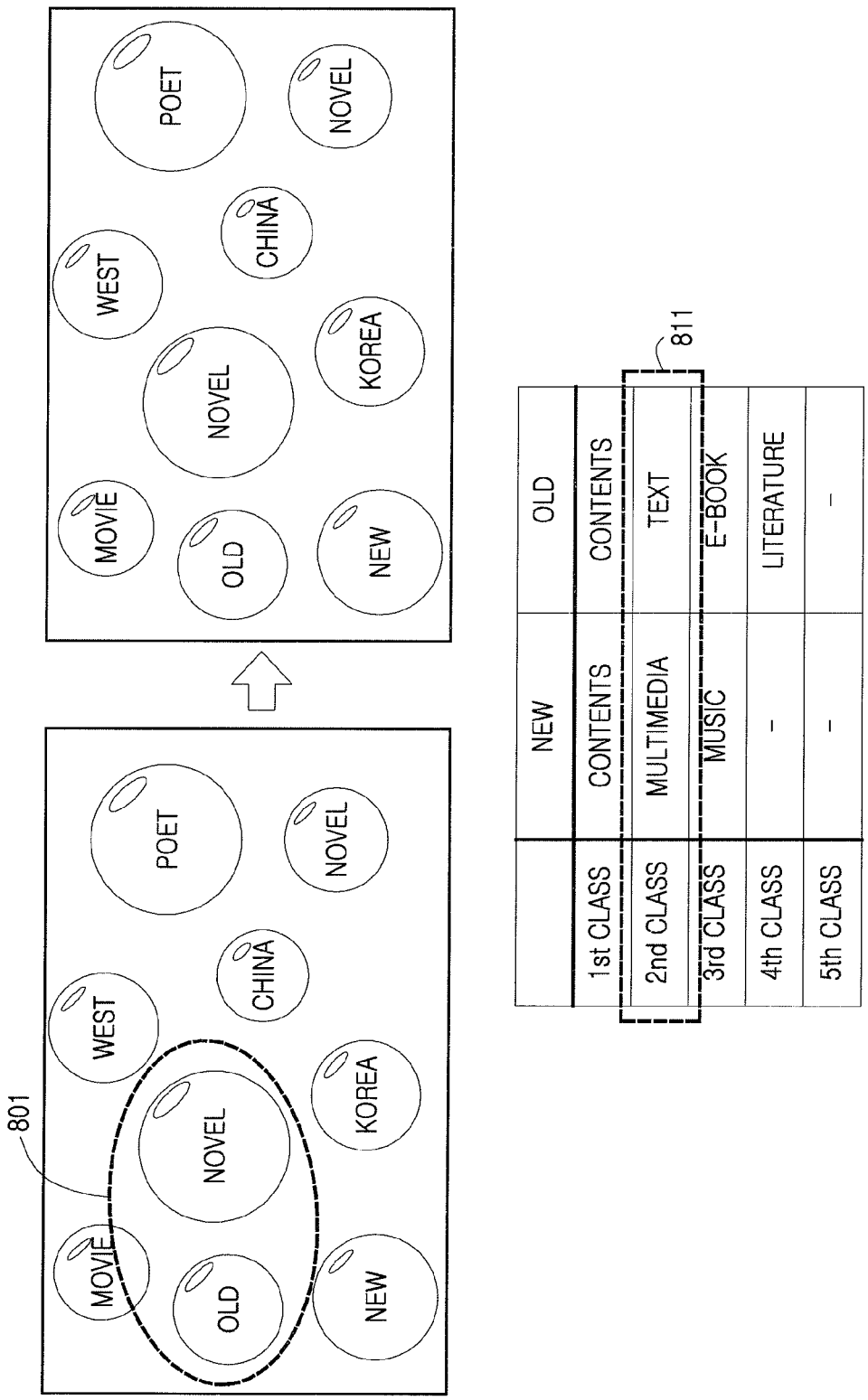
FIG. 8 is a view illustrating a case where merging of menu items is impossible in a portable terminal according to an exemplary embodiment of the present invention.

FIG. 8 is a view illustrating a case where merging of menu items is impossible in a portable terminal according to an exemplary embodiment of the present invention.

Referring to FIG. 8, in the case where a user intends to merge the item "Old" and the item "Novel" (collectively denoted by 801), assuming that the threshold step is a step 1, since the higher step attributes of the item "Old" and the item "Novel" are the same, that is "Contents", for only a step 1, and are different, that is "Multimedia" and "Text", for a step 2 (as shown by 811), the portable terminal may inform the user that the item "Old" and the item "Novel" cannot be merged.

Returning to step 303 of FIG. 3A, when the user input is an input for dividing one item, the portable terminal proceeds to step 327 of FIG. 3C to determine the attribute of a lower step of the one item selected by the user input, and determines whether a plurality of lower step attributes exist in step 329. When one lower step attribute exists for one item, the portable terminal proceeds to step 331 to inform that the selected item cannot be divided and ends the algorithm according to an exemplary embodiment of the present invention.

In contrast, when the plurality of lower step attributes exist for the one item, the portable terminal proceeds to step 333 to display the plurality of lower step attributes on the screen, and receives a division scheme for the lower step attributes from the user in step 335. For example, in the case where the attributes of the contents for the one item is a, b, c, and d, the portable terminal displays the attributes a, b, c, and d on the screen, and requests the user to set the division scheme for the item having the attributes a, b, c, and d. At this point, the user may set to divide the item into an item having the attributes a and b, and an item having the attributes c and d, and divide the item into an item having the attributes a, c, and d, and an item having the attribute b, and divide the item into an item having the attribute a, an item having the attributes b and c, and an item having the attribute d. That is, the division scheme for dividing the item may be set to various schemes depending on the user. The portable terminal divides contents included in the selected one item according to a division scheme set by the user to generate two or more items in step 337. Of course, the dividing of the one item may be performed according to a scheme set in advance in the portable terminal without the user's setting.

After that, the portable terminal proceeds to step 325 of FIG. 3B to store information regarding changed items and display the same.

As described above, exemplary embodiments of the present invention generate a plurality of items by dividing one item according to the user's touch operation for the item forming a menu, or generate a new item by merging a plurality of items. Hereinafter, an exemplary embodiment to which the present invention has been applied is described based on the above description.

Figure 9:
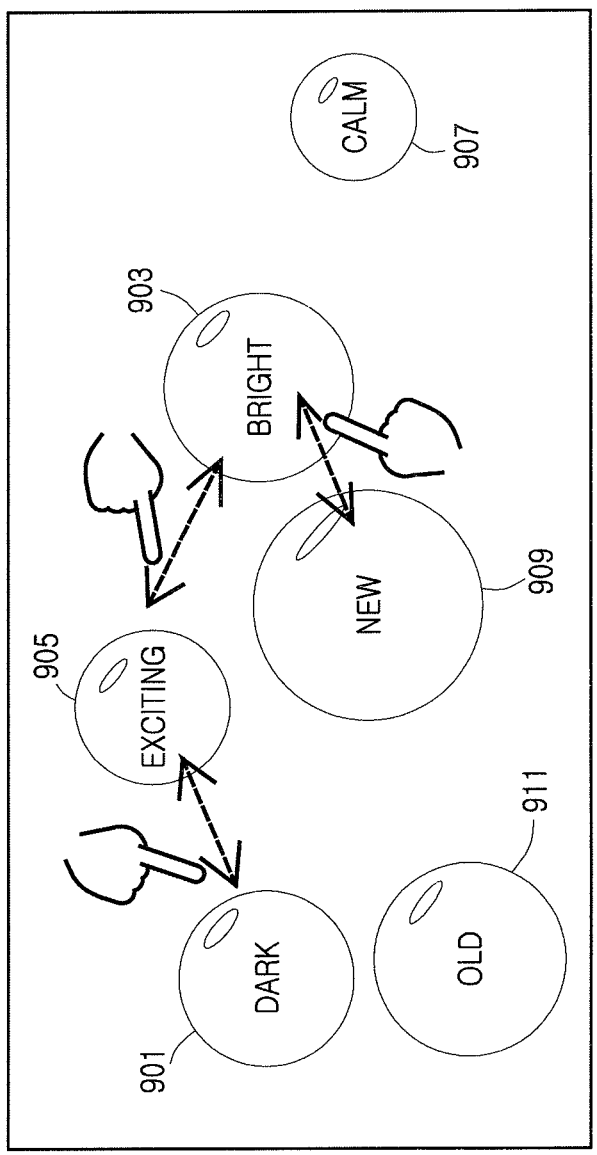
FIG. 9 is a view illustrating a case of changing a menu item regarding music contents in a portable terminal according to an exemplary embodiment of the present invention.

FIG. 9 is a view illustrating a case of changing a menu item regarding music contents in a portable terminal according to an exemplary embodiment of the present invention.

Referring to FIG. 9, the portable terminal classifies music contents reproducible via a music reproducer into a plurality of items according to a release date as described below.

Dark 901: music of dark feeling (e.g., Rap, Heavy Metal, Rock, Classic Music)
Bright 90): music of bright feeling (e.g., Dance, Hip-hop, Jazz, Rock, Country Song)
Exciting 905: music having fast and strong beats (e.g., Dance, House, Heavy Metal)
Calm 907: music having slow beats and loose feeling (e.g., Classic Music, Jazz, Ballad)
New 909: music recently released
Old 911: music released long ago As described above, in the case where a menu item for music contents is configured, when the user drags the item Dark 901 and the item Exciting 905 simultaneously, the portable terminal may combine the item Dark 901 and the item Exciting 905 to generate an item including music of a new feeling that does not exist on the menu item, that is, music having a dark feeling and fast and strong beats (e.g., heavy metal).

In addition, when the user drags the item Bright 903 and the item Exciting 905 simultaneously, the portable terminal may generate an item (e.g., Dance) including music having a bright feeling, fast and strong beats.

In addition, when the user drags the item New 909 and the item Bright 903 simultaneously, the portable terminal may generate an item including music of a bright feeling among recently released music.

Figure 10:
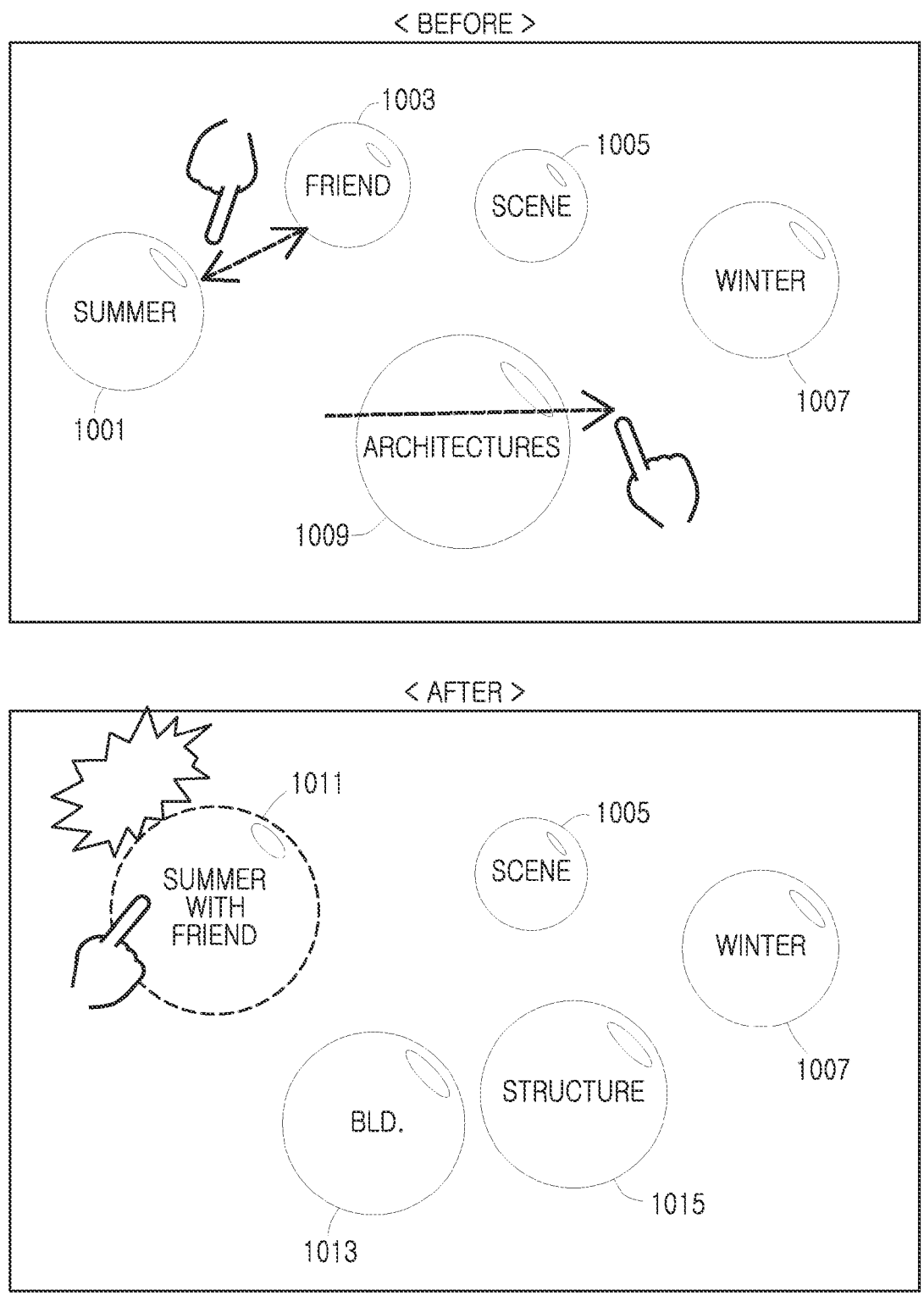
FIG. 10 is a view illustrating a case of changing a menu item of an album in a portable terminal according to an exemplary embodiment of the present invention.

FIG. 10 is a view illustrating a case of changing a menu item of an album in a portable terminal according to an exemplary embodiment of the present invention.

Referring to FIG. 10A, the portable terminal classifies photos stored in a photo album into Summer 1001, Friend 1003, Scene 1005, Winter 1007, and Architecture 1009 depending on seasons and objects based on tagging information of the photos, and then displays the respective items on the screen. Here, when the item Summer 1001 and the item Winter 1007 belong to one season group having different season characteristics and the item Friend 1003, the item Scene 1005 and the item Architecture 1009 belong to one object group having different object characteristics, it is assumed that a merge rule for merging an item belonging to the season group and an item belonging to the object group is determined in advance in the portable terminal.

Under this circumstance, when a user drags the item Summer 1001 and the item Friend 1003 simultaneously, since the item Summer 1001 and the item Friend 1003 have different attributes, that is, the season attribute and the object attribute, respectively, and so the parent items are different, the portable terminal may generate one new item called Summer with Friend 1011 according to the predetermined merge rule. Then, the user may classify photos taken in summer with his friend from an album and view them by clicking the item Summer with Friend 1011.

In addition, when the user performs a slide touch on the item Architecture 1009 under this circumstance, the portable terminal determines that the lower step attribute of the item Architecture 1009 is Building and Structure, divides photos included in the item Architecture 1009 into photos of the attribute Building and photos of the attribute Structure, and then generate an item Building 1013 and an item Structure 1015. Then, the user may view only photos including a building by clicking the item Building 1013, and may view only photos including a structure by clicking the item Structure 1015.

Figure 11:
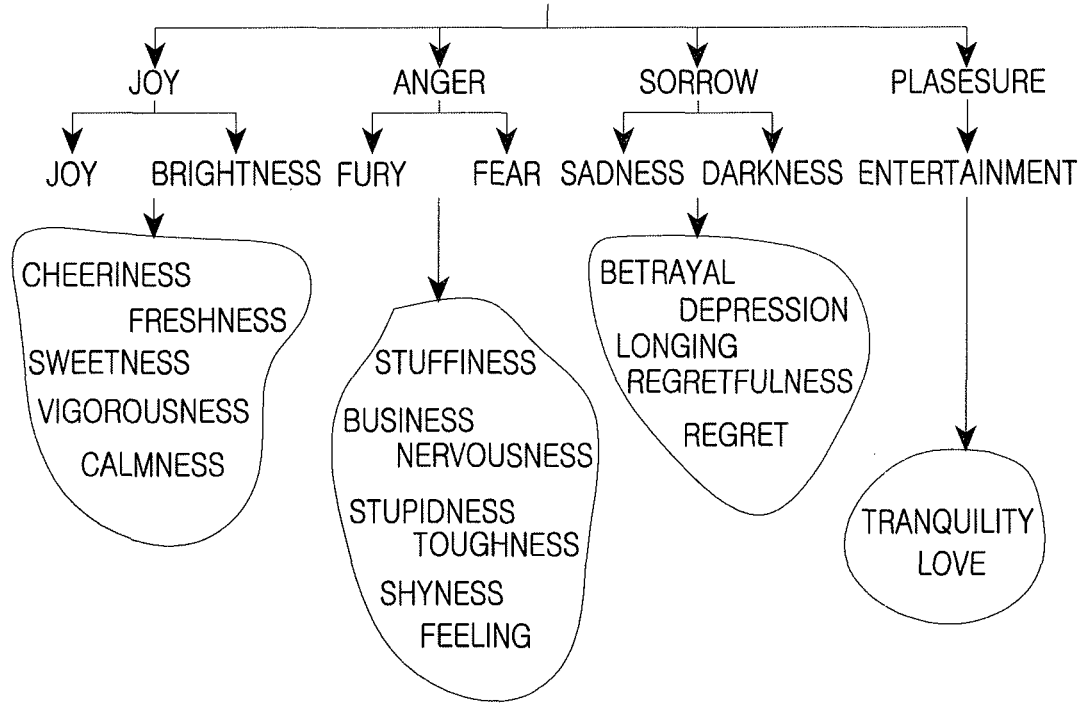
FIGS. 11 and 12 are views illustrating a case of configuring a menu item under a user's control in a portable terminal according to an exemplary embodiment of the present invention.
Figure 12:
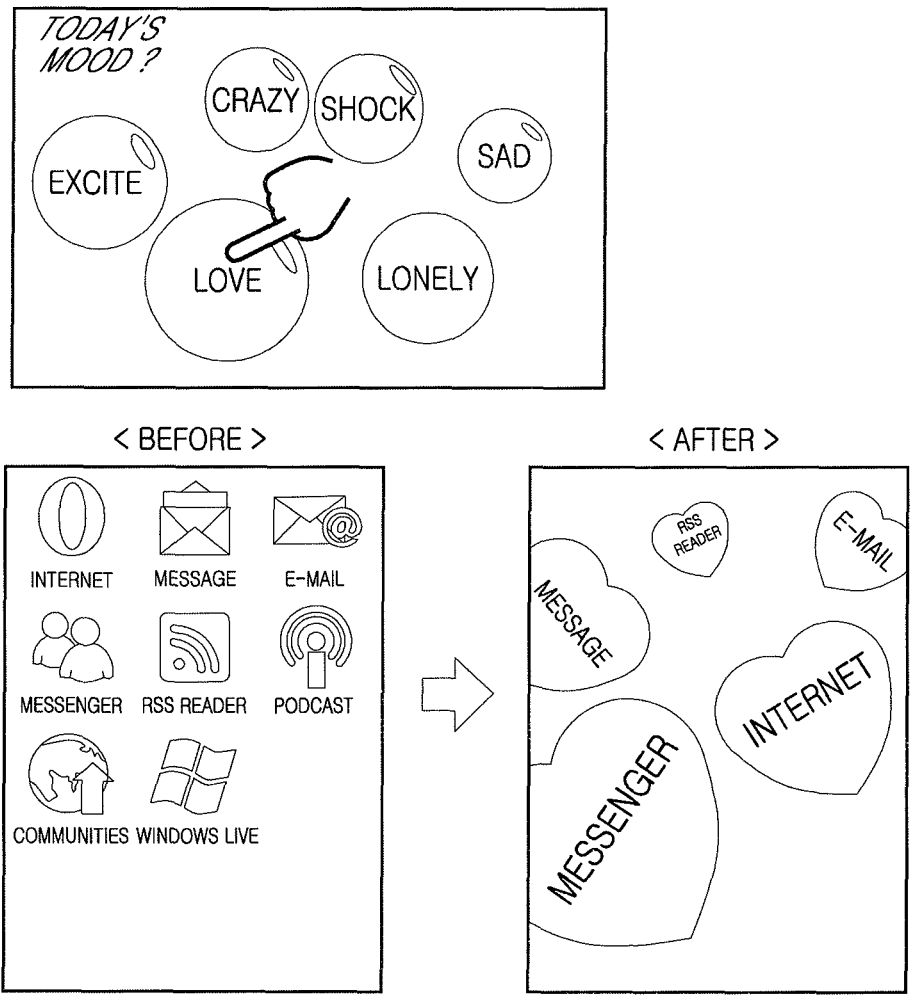

FIGS. 11 and 12 are views illustrating a case of configuring a menu item under a user's control in a portable terminal according to an exemplary embodiment of the present invention.

Referring to FIGS. 11 and 12, exemplary embodiments of the present invention may automatically change a background screen, a screen theme, a bell sound, etc. of the portable terminal based on a function of changing a menu item as described above. That is, when a user selects a specific emotion, the portable terminal may configure the background screen, the screen theme, the belling sound, etc. using items having attributes corresponding to the specific emotion.

Figure 13C:
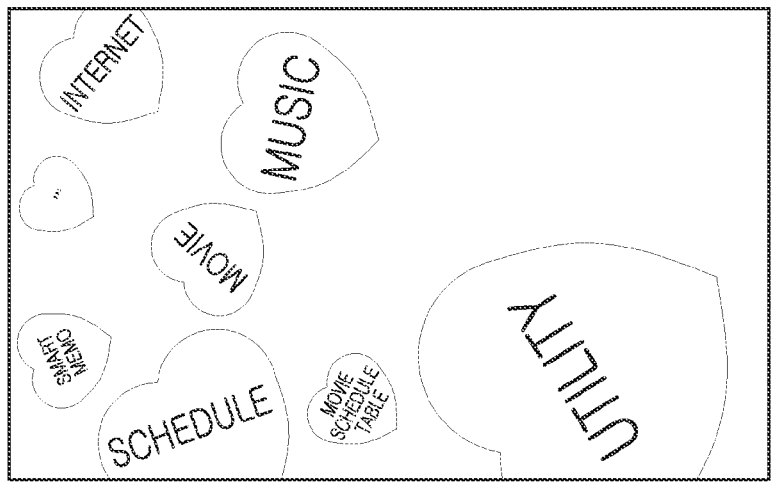
FIGS. 13A through 13C are views illustrating a case of generating a menu item having a new meaning by merging menu items in a portable terminal according to an exemplary embodiment of the present invention.
Figure 13B:
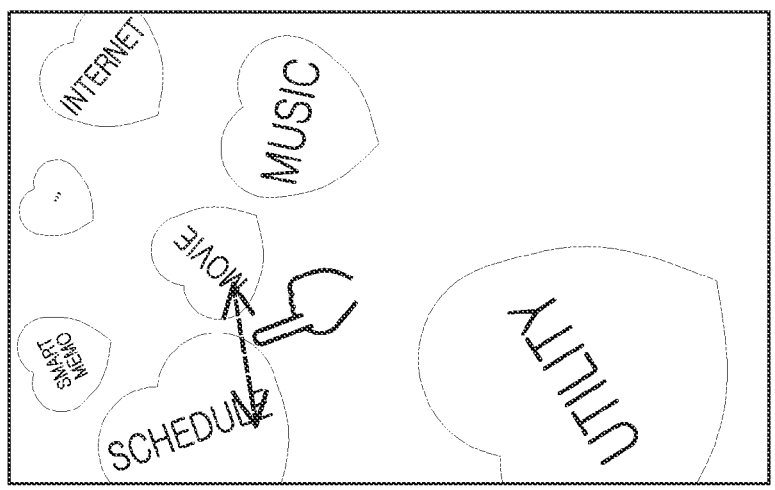
Figure 13A:
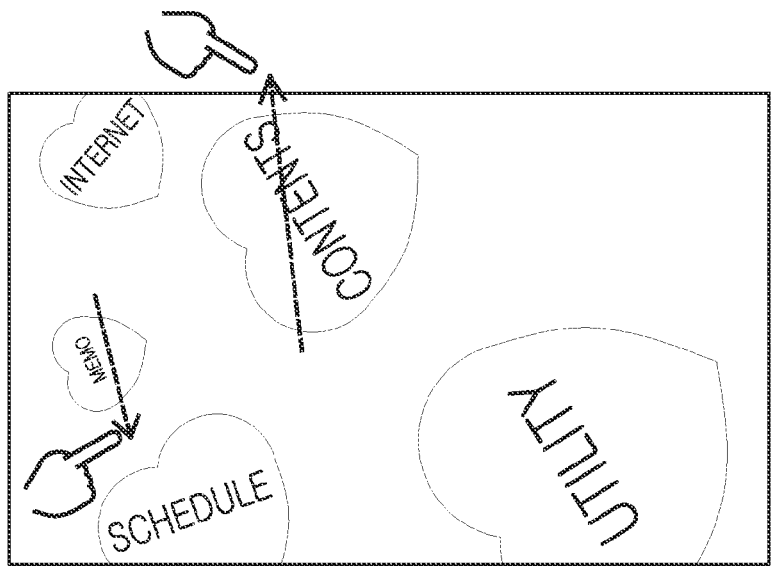

FIGS. 13A through 13C are views illustrating a case of generating a menu item having a new meaning by merging menu items in a portable terminal according to an exemplary embodiment of the present invention.

Referring to FIGS. 13A through 13C, exemplary embodiments of the present invention may change a main menu provided by the portable terminal using the menu item change function. For example, when a user performs a slide touch on a menu item and a contents item with the main menu configured with a schedule, Utility, contents, memo, and Internet access as illustrated in FIG. 13A, the portable terminal divides the memo item into a smart memo item and a Note item, divides the contents item into a movie item and a music item according to the attribute of each item as illustrated in FIG. 13B to provide a new item from the main menu. In addition, here, when the user touches and drags the schedule item and the movie item simultaneously as illustrated in FIG. 13B, the portable terminal generates a movie time table item representing a movie schedule by merging the schedule item and the movie item according to the predetermined merge rule as illustrated in FIG. 13C.

Here, the portable terminal may store in advance the following merge rules in order to change the main menu.

Rule 1: schedule+contents (i.e., music, movie)
movie time table, concert time table
generate as a lower item of a schedule item in menu tree
maintain menu tree information for merged two items
Rule 2: phone book+sound
set a sound for each phone number
generate as a lower item of a phone book in menu tree
maintain menu tree information for merged two items
Rule 3: message+alarm
an informing method for each message
generate as a lower item of a message in menu tree
maintain menu tree information for merged two items Of course, the above described merge rules may be added, deleted, and changed by a designer and/or a user.

Figure 14:
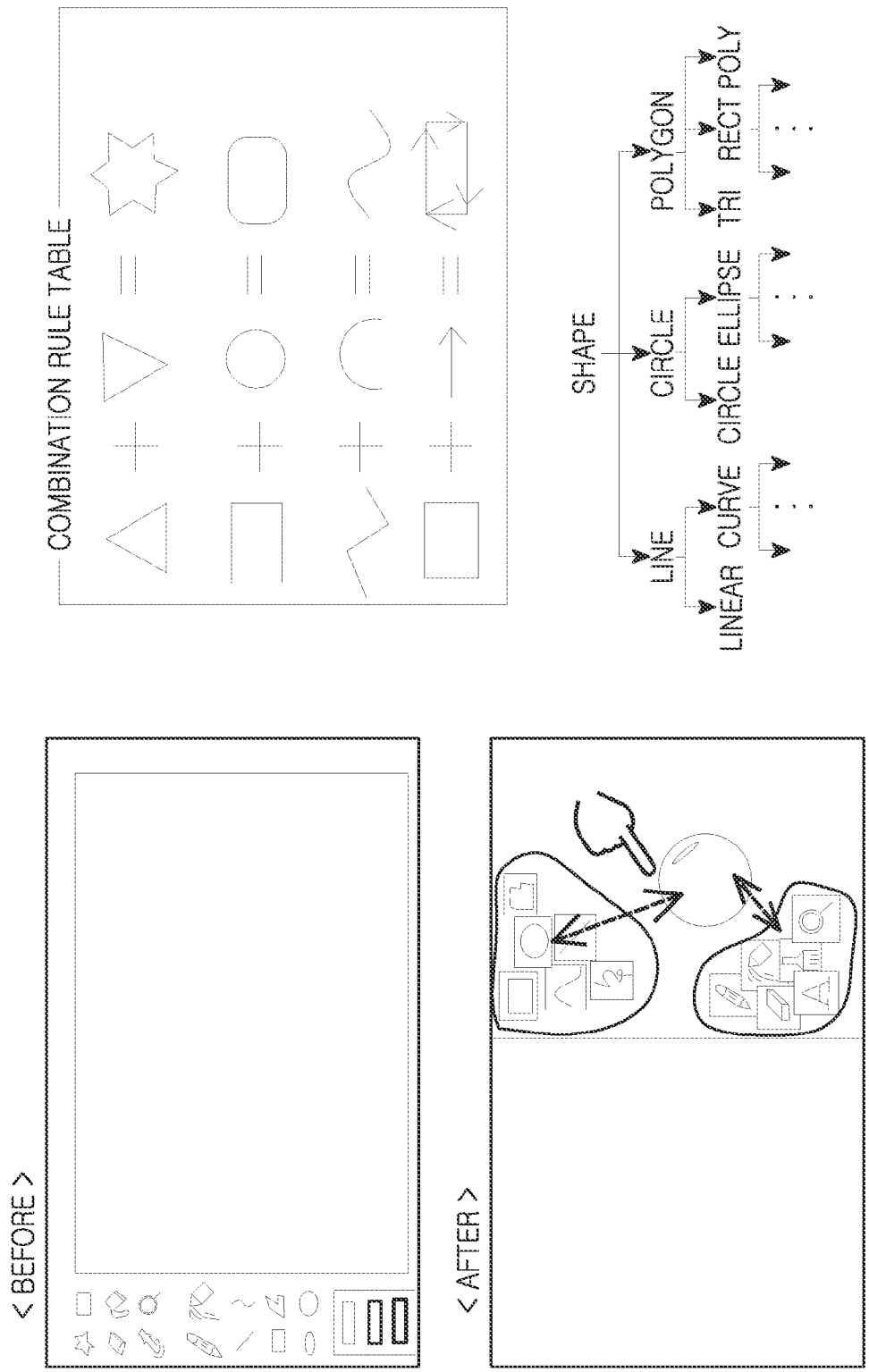
FIG. 14 is a view illustrating a case of changing a menu item when a picture plate function is performed in a portable terminal according to an exemplary embodiment of the present invention.

FIG. 14 is a view illustrating a case of changing a menu item when a picture plate function is performed in a portable terminal according to an exemplary embodiment of the present invention.

Referring to FIG. 14, exemplary embodiments of the present invention may change a menu item of an application provided by the portable terminal through the menu item change function. That is, referring to FIG. 14, in a case of the picture plate of the related art, a user has an inconvenience of having to select the kind and the thickness of a brush, color, a shape pattern, etc. used for drawing a picture one by one through the menu in order to draw a picture. However, according to exemplary embodiments of the present invention, when a user selects items used for drawing a picture one by one, a new item is generated by merging the selected items, so that even when the user selects only the generated item afterward, the user may draw a picture.

In addition, in a case of the picture plate of the related art, a menu provided to the user is limited. For example, figures or symbols provided by the picture plate of the related art are limited. However, as illustrated in FIG. 14, according to exemplary embodiments of the present invention, a user may generate a new figure or symbol by touching two or more figures and dragging them. For example, in the portable terminal, a user may generate an item representing a star-shaped figure by touching two triangles (▲, ▼) of opposite shapes and dragging them according to a predetermined merge rule.

Figure 15:
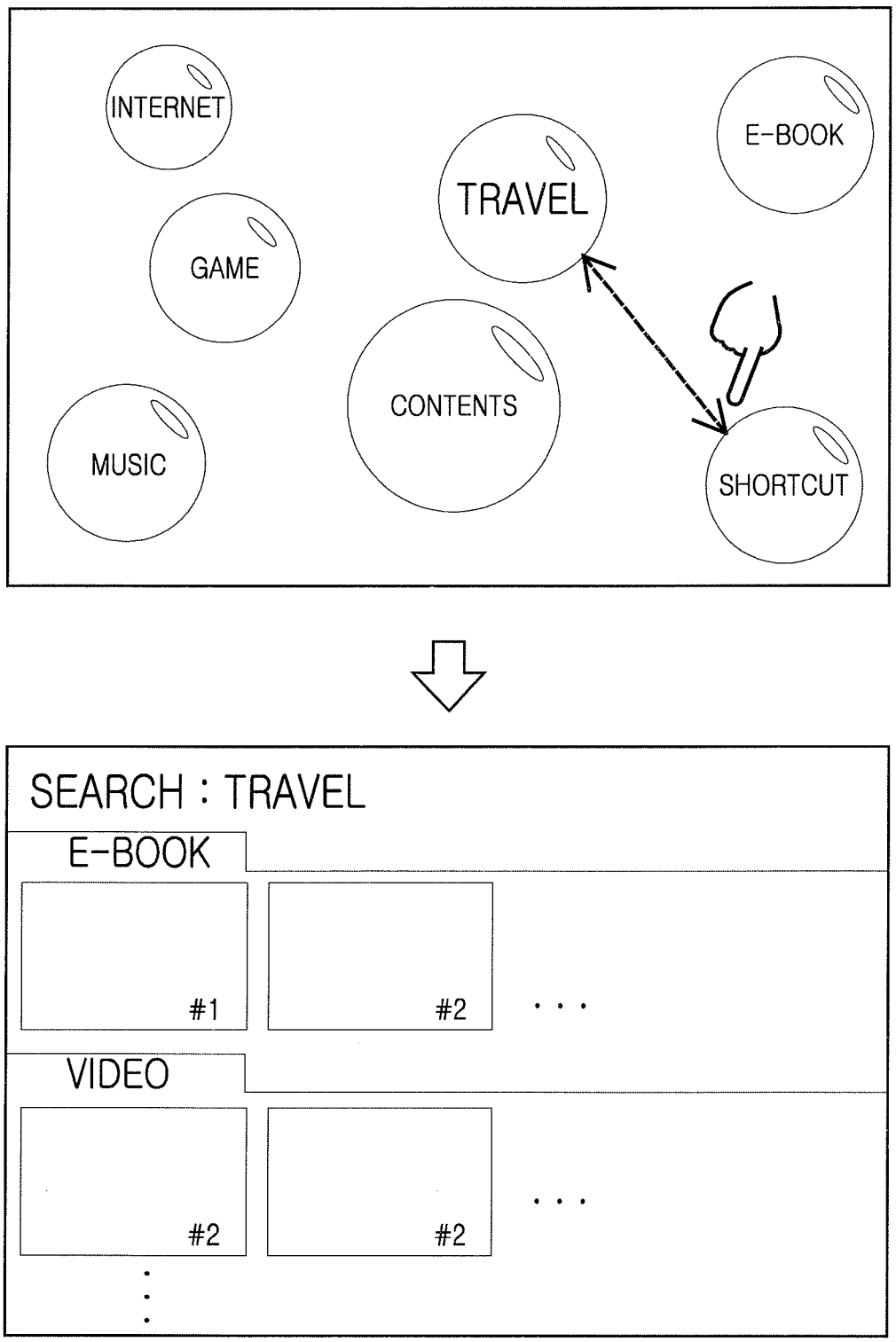
FIG. 15 is a view illustrating a case of searching for contents using a menu item merging in a portable terminal according to an exemplary embodiment of the present invention.

FIG. 15 is a view illustrating a case of searching for contents using a menu item merging in a portable terminal according to an exemplary embodiment of the present invention.

Referring to FIG. 15, according to an exemplary embodiment of the present invention, a user may easily access desired contents or a desired application using the above-described menu item change function. That is, the portable terminal according to an exemplary embodiment of the present invention displays items forming a menu tree on the screen. When the user touches and drags two items simultaneously, the portable terminal allows the user to immediately access contents or an application having an attribute corresponding to the two items. For example, as illustrated in FIG. 15, a menu tree is configured with keywords representing respective contents or application, and a keyword item and a shortcut item are displayed. When a specific keyword item and a specific shortcut are selected by the user, the portable terminal may display contents or an application having an attribute corresponding to the specific item on the screen. When two keyword items are selected by the user, the portable terminal may display contents or an application corresponding to the two keyword items.

Of course, for this purpose, the portable terminal should define in advance merge rules as follows.

Rule 1: shortcut+Game
Games are collected from applications registered in a shortcut and displayed on a screen.
Rule 2: Travel+E-book
E-Book contents related to a travel are collected and displayed or executed on a screen.
Rule 3: Music+Game
Contents related to Game are collected from music contents and a reproduction list is generated.

In addition, though not shown in the drawings of the exemplary embodiments of the present invention, the portable terminal may manage a transmission/reception message and transmission/reception communication list through the function of dividing and merging a menu item. That is, the portable terminal classifies transmission/reception messages into a plurality of items depending on a sender, a receiver, a transmission date, a reception date, Short Message Service (SMS), and Multimedia Messaging Service (MMS), and displays keywords representing the plurality of items on the screen. When the user touches and drags two keywords simultaneously, the portable terminal may generate an item including only common messages among messages that belong to items corresponding to the two keywords. For example, when a receiver "a" and an SMS are selected, the portable terminal may generate an item including only messages whose receiver is "a" among stored SMS. When a sender "b" and a transmission date x are selected, the portable terminal may generate an item including only messages whose transmission date is x among messages whose sender is "b". This may be applicable to the transmission/reception communication list.

Though exemplary embodiments of the present invention have described the dividing and merging of a menu item according to a user's taste by detecting the user's intuitive touch operation based on a touch screen in a portable terminal, the dividing and merging of the menu item may be performed through key manipulation of a keypad instead of the touch screen.

Exemplary embodiments of the present invention may divide or merge a menu item according to a user's taste by providing a user interface for managing the menu item based on meaning under the control of a user in a portable terminal, and efficiently manage a folder or an application menu item inside the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing an item in a portable terminal, the method comprising:
displaying a plurality of items on a display of the portable terminal, wherein each item is associated with a command associated with content stored in the portable terminal;
selecting at least two items from the plurality of items based on an input;
identifying an attribute of the selected at least two items;
identifying a parent attribute corresponding to the selected at least two items based on the identified attribute of the selected at least two items;

determining whether parent items of the at least two items are equal by comparing the identified parent attribute of the selected at least two items;

in response to determining that the parent items are equal, displaying a first item corresponding to the selected at least two items based on the identified parent attribute;

in response to determining that the parent items are not the equal, determining whether a rule corresponding to the selected at least two items exists among merge rules; and in response to determining that the corresponding rule exists, displaying a second item corresponding to the selected at least two items based on the corresponding rule, wherein the attribute comprises a hierarchical attribute predefined in the portable terminal, wherein the display of the selected at least two items displayed on the display is removed, and wherein the input comprises at least one of a drag of touch input corresponding to the at least two items, and a closed curve-shaped touch to include the at least two items.

2. The method of claim 1, wherein the portable terminal stores the items displayed on the screen in a form of a menu tree, and stores an attribute with respect to each item, and wherein the menu tree comprises a plurality of steps, each step representing an attribute of the item displayed on the screen.

3. The method of claim 1, further comprising:

when the corresponding rule does not exist, determining whether attributes of a threshold step or greater than the threshold step are equal among parent attributes of the selected at least two items; and when the attributes of the threshold step or greater than the threshold step are equal, generating a new item by merging the selected at least two items, and when the attributes of the threshold step or greater than the threshold step are not equal, informing that the selected at least two items are not merged.

4. An apparatus for managing an item in a portable terminal, the apparatus comprising:

a display configured to display a plurality of items, wherein each item is associated with a command associated with content stored in the portable terminal;

an input unit configured to receive an input; and at least one processor configured to:

select at least two items from the plurality of items based on the received input, identify an attribute of the selected at least two items, identify a parent attribute corresponding to the selected at least two items based on the identified attribute of the selected at least two items, determine whether parent items of the at least two items are equal by comparing the identified parent attribute of the selected at least two items, in response to determining that the parent items are equal, control the display to display a first item corresponding to the selected at least two items based on the identified parent attribute, in response to determining that the parent items are not equal, determine whether a rule corresponding to the selected at least two items exists among merge rules, and in response to determining that the corresponding rule exists, control the display to display a second item corresponding to the selected at least two items based on the corresponding rule, wherein the attribute comprises a hierarchical attribute predefined in the portable terminal, wherein the display of the selected at least two items displayed on the display is removed, and wherein the input comprises at least one of a drag of touch input corresponding to the at least two items, and a closed curve-shaped touch to include the at least two items.

5. The apparatus of claim 4, wherein the at least one processor is further configured to store the items displayed on the display in a form of a menu tree, and stores an attribute respect to each item, wherein the menu tree comprises a plurality of steps, each step representing an attribute of the item displayed on the display.

6. The apparatus of claim 4, the at least one processor is further configured to:

when the corresponding rule does not exist, determine whether attributes of a threshold step or greater than the threshold step are equal among parent attributes of the selected at least two items, when the attributes of the threshold step or greater than the threshold step are equal, generate a new item by merging the selected at least two items, and when the attributes of the threshold step or greater than the threshold step are not equal, inform that the selected at least two items are not merged.

* * * * *